United States Patent
Arya et al.

(10) Patent No.: US 8,732,036 B2
(45) Date of Patent: May 20, 2014

(54) SUPPLIER/BUYER NETWORK THAT PROVIDES CATALOG UPDATES

(75) Inventors: Jitesh Arya, Sunnyvale, CA (US); Tejaswi Sundarram, Bangalore (IN); Alex Makarweycz, San Mateo, CA (US)

(73) Assignee: Ariba, Inc., Sunnyvale, CA (US)

( * ) Notice: Subject to any disclaimer, the term of this patent is extended or adjusted under 35 U.S.C. 154(b) by 168 days.

(21) Appl. No.: 13/088,387

(22) Filed: Apr. 17, 2011

(65) Prior Publication Data

US 2011/0276435 A1 Nov. 10, 2011

Related U.S. Application Data

(60) Provisional application No. 61/332,370, filed on May 7, 2010.

(51) Int. Cl.
G06Q 30/00 (2012.01)

(52) U.S. Cl.
USPC .................................... 705/27.1; 705/26.1

(58) Field of Classification Search
USPC ..................... 705/26.1, 27.1, 26.61
See application file for complete search history.

(56) References Cited

U.S. PATENT DOCUMENTS

| | | | |
|---|---|---|---|
| 6,285,989 B1 | 9/2001 | Shoham | |
| 6,584,451 B1 | 6/2003 | Shoham et al. | |
| 6,606,603 B1 | 8/2003 | Joseph et al. | |
| 6,952,682 B1 | 10/2005 | Wellman | |
| 7,072,061 B2 | 7/2006 | Blair et al. | |
| 7,117,165 B1 | 10/2006 | Adams et al. | |
| 7,130,815 B1 | 10/2006 | Gupta | |
| 7,146,331 B1 | 12/2006 | Young | |
| 7,152,043 B2 | 12/2006 | Alaia et al. | |
| 7,225,145 B2 | 5/2007 | Whitley et al. | |
| 7,225,152 B2 | 5/2007 | Atkinson et al. | |
| 7,249,085 B1 | 7/2007 | Kinney, Jr. et al. | |
| 7,283,979 B2 | 10/2007 | Tulloch et al. | |
| 7,283,980 B2 | 10/2007 | Alaia et al. | |
| 7,296,001 B1 | 11/2007 | Ephrati et al. | |
| 7,324,936 B2 | 1/2008 | Saldanha et al. | |
| 7,346,574 B2 | 3/2008 | Smith et al. | |
| 7,383,206 B2 | 6/2008 | Rupp et al. | |
| 7,395,238 B2 | 7/2008 | Alaia et al. | |
| 7,401,035 B1 | 7/2008 | Young | |
| 7,444,299 B2 | 10/2008 | Smith et al. | |
| 7,483,852 B2 | 1/2009 | Marhafer et al. | |
| 7,499,876 B2 | 3/2009 | Rupp et al. | |
| 7,536,319 B2 | 5/2009 | Thakur et al. | |

(Continued)

OTHER PUBLICATIONS

Gilbert, A., "Commerce one returns to its roots," InformationWeek (844), Jul. 2, 2001, 53.*

*Primary Examiner* — Brandy A Zukanovich
(74) *Attorney, Agent, or Firm* — Brian R. Short

(57) ABSTRACT

Embodiments for a supplier/buyer (S/B) network providing catalog updates are disclosed. One method includes the S/B network receiving a request for an update of product information of a catalog. The S/B network receives a profile request of at least one supplier from a buyer. The S/B network confirms that the at least one supplier supports product updates. If the at least one supplier supports product information updates, then the S/B network receives the request for a product information update from the buyer, and requests the product information update from the at least one supplier. The S/B network receives the product information update from the at least one supplier, and the S/B network updates the catalog based on the product information update.

16 Claims, 4 Drawing Sheets

(56) References Cited

U.S. PATENT DOCUMENTS

| | | |
|---|---|---|
| 7,536,362 B2 | 5/2009 | Starr et al. |
| 7,558,746 B2 | 7/2009 | Alaia et al. |
| 7,558,752 B1 | 7/2009 | Ephrati et al. |
| 7,571,137 B2 | 8/2009 | Alaia et al. |
| 7,599,878 B2 | 10/2009 | Atkinson et al. |
| 7,634,439 B1 | 12/2009 | Smith |
| 7,657,461 B2 | 2/2010 | Young |
| 7,693,747 B2 | 4/2010 | Bryson et al. |
| 7,792,707 B2 | 9/2010 | Alaia et al. |
| 7,792,713 B1 | 9/2010 | Kinney, Jr. et al. |
| 7,813,966 B2 | 10/2010 | Alaia et al. |
| 7,835,957 B1 | 11/2010 | Kinney, Jr. |
| 7,840,476 B1 | 11/2010 | Zack et al. |
| 7,870,034 B2 | 1/2011 | Rupp et al. |
| 7,870,054 B2 | 1/2011 | Abeshouse et al. |
| 7,870,115 B2 | 1/2011 | Blair et al. |
| 7,921,053 B2 | 4/2011 | Kinney, Jr. et al. |
| 7,974,908 B1 | 7/2011 | Hommrich et al. |
| 8,086,518 B1 | 12/2011 | Maor |
| 8,095,451 B2 | 1/2012 | Smith et al. |
| 8,126,701 B2 | 2/2012 | Beck |
| 8,126,799 B2 | 2/2012 | Kellam et al. |
| 8,190,482 B1 | 5/2012 | Federighi et al. |
| 2002/0107761 A1* | 8/2002 | Kark et al. .................. 705/27 |
| 2005/0251409 A1* | 11/2005 | Johnson et al. ................ 705/1 |
| 2006/0218058 A1* | 9/2006 | Wojcik et al. ................ 705/28 |
| 2007/0214060 A1 | 9/2007 | Whitley et al. |
| 2007/0239596 A1 | 10/2007 | Kinney, Jr. et al. |
| 2007/0299765 A1 | 12/2007 | Smith et al. |
| 2008/0027879 A1 | 1/2008 | Ephrati et al. |
| 2008/0065526 A1 | 3/2008 | Smith et al. |
| 2008/0071672 A1 | 3/2008 | Rupp et al. |
| 2008/0126080 A1 | 5/2008 | Saldanha et al. |
| 2008/0126221 A1 | 5/2008 | Swanson |
| 2008/0133377 A1 | 6/2008 | Alaia et al. |
| 2008/0133397 A1 | 6/2008 | Tulloch et al. |
| 2008/0133398 A1 | 6/2008 | Kinney et al. |
| 2008/0133399 A1 | 6/2008 | Rupp et al. |
| 2008/0147533 A1 | 6/2008 | Alaia et al. |
| 2008/0147534 A1 | 6/2008 | Ephrati et al. |
| 2008/0154763 A1 | 6/2008 | Alaia et al. |
| 2008/0160909 A1* | 7/2008 | Khedouri et al. ............ 455/3.06 |
| 2008/0162285 A1 | 7/2008 | Tulloch et al. |
| 2008/0162330 A1 | 7/2008 | Atkinson et al. |
| 2008/0162331 A1 | 7/2008 | Ephrati et al. |
| 2008/0162332 A1 | 7/2008 | Alaia et al. |
| 2008/0183614 A1 | 7/2008 | Gujral et al. |
| 2008/0208616 A1 | 8/2008 | Young |
| 2009/0099933 A1 | 4/2009 | Marhafer et al. |
| 2009/0171811 A1 | 7/2009 | Peter et al. |
| 2010/0017273 A1 | 1/2010 | Hommrich et al. |
| 2010/0057806 A1 | 3/2010 | Neal et al. |
| 2011/0078046 A1 | 3/2011 | Tan et al. |
| 2011/0166951 A1 | 7/2011 | Abeshouse et al. |

* cited by examiner

SUPPLIER/BUYER NETWORK THAT PROVIDES CATALOG UPDATES

RELATED APPLICATIONS

This patent application claims priority to U.S. Provisional Patent Application No. 61/332,370 filed on May 7, 2010 which is herein incorporated by reference.

FIELD OF THE DESCRIBED EMBODIMENTS

The described embodiments relate generally to a supplier network. More particularly, the described embodiments relate to a method, apparatus and system for a supplier/buyer network that provides catalog updates.

BACKGROUND

Searchable electronic catalogs are commonly used in support of electronic commerce and purchasing functions. However, the catalogs loaded by buyers on their systems may not reflect the current prices of the items within the catalogs. As the catalog may have been loaded a while ago, the search result does not guarantee the exact picture to the buyer. That is, the buyer is not assured to have the latest price and availability information, which clearly, can lead to problems.

An out-of-date catalog may not provide the buyer with accurate product information. For example, when viewing a punch-out item, the buyer sees a price in the catalog, and clicks on a 'Buy from Supplier' button/link in, for example, an Ariba Buyer (®) product that punches the buyer out to the supplier site. It can be baffling to the buyer to see the new price there. This scenario can get worse if the buyer notices the price change only after ordering or receiving the item.

Item comparisons can be misleading if, for example, a price comparison is on an outdated catalog. More specifically, the buyer is not provided with the correct product comparison information.

An outdated catalog can result in a loss of business for a supplier. For example, if a price of a product is reduced but not reflected in a buyer's catalog, the buyer may very well chose not to buy a product from that supplier. Additionally, outdated catalogs can result in buyers submitting purchase orders for products that are no longer available, or for products in which the price of the product has changed. Providing a buyer with a new catalog whenever the catalog is updated can be cumbersome due to the large amount of information that can exist within the catalog.

There is a need for a system, method and apparatus for providing a buyer with updated catalog product information, wherein a download (or uploading) of a catalog is not required each time information related to products within the catalog are updated.

SUMMARY

An embodiment includes a computer-method of a supplier/buyer (S/B) network providing catalog updates. The method includes the S/B network receiving a request for an update of product information of a catalog. The S/B network receives a profile request of at least one supplier from a buyer. The S/B network confirms that the at least one supplier supports product updates. If the at least one supplier supports product information updates, then the S/B network server receives the request for a product information update from the buyer, and requests the product information update from the at least one supplier. The S/B network receives the product information update from the at least one supplier, and the S/B network updates the catalog based on the product information update.

Another embodiment includes a supplier/buyer (S/B) network that provides catalog updates. An S/B network server the S/B network receives a request for an update of product information of a catalog. A buyer server submits a profile request of at least one supplier to the S/B network server. The S/B network server confirming that the at least one supplier supports product information updates. If the at least one supplier supports product information updates, then the S/B network server receiving a request for a product information update from the buyer server, and requesting the product information update from the at least one supplier server. A supplier server provides the S/B network server with the product information update, and the S/B network server updates the catalog based on the product information update.

Another embodiment includes a program storage device readable by a machine, tangibly embodying a program of instructions executable by the machine to perform a method of providing catalog updates. The method performed includes a supplier/buyer (S/B) network the S/B network receiving a request for an update of product information of a catalog. The S/B network server receives a profile request of at least one supplier from a buyer. The S/B network confirming that the at least one supplier supports product updates. If the at least one supplier supports product information updates, then the S/B network server receives a request for a product information update from the buyer, and requests the product information update from the at least one supplier. The S/B network receiving the product information update from the at least one supplier, and the S/B network updates the catalog based on the product information update.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, systems and apparatuses for providing catalog updates of suppliers to buyers. The catalogs can be provided by many different suppliers, to many different buyers. Updates to the catalogs can be made available to the buyer either at a buyer's request, or periodically at a selectable rate. The updates are provided while minimizing the amount of changes to the catalog information. The described embodiments provide updates without requiring an entire catalog update. Therefore, complete validation and approval of the updated catalog is not required.

Figure 1:
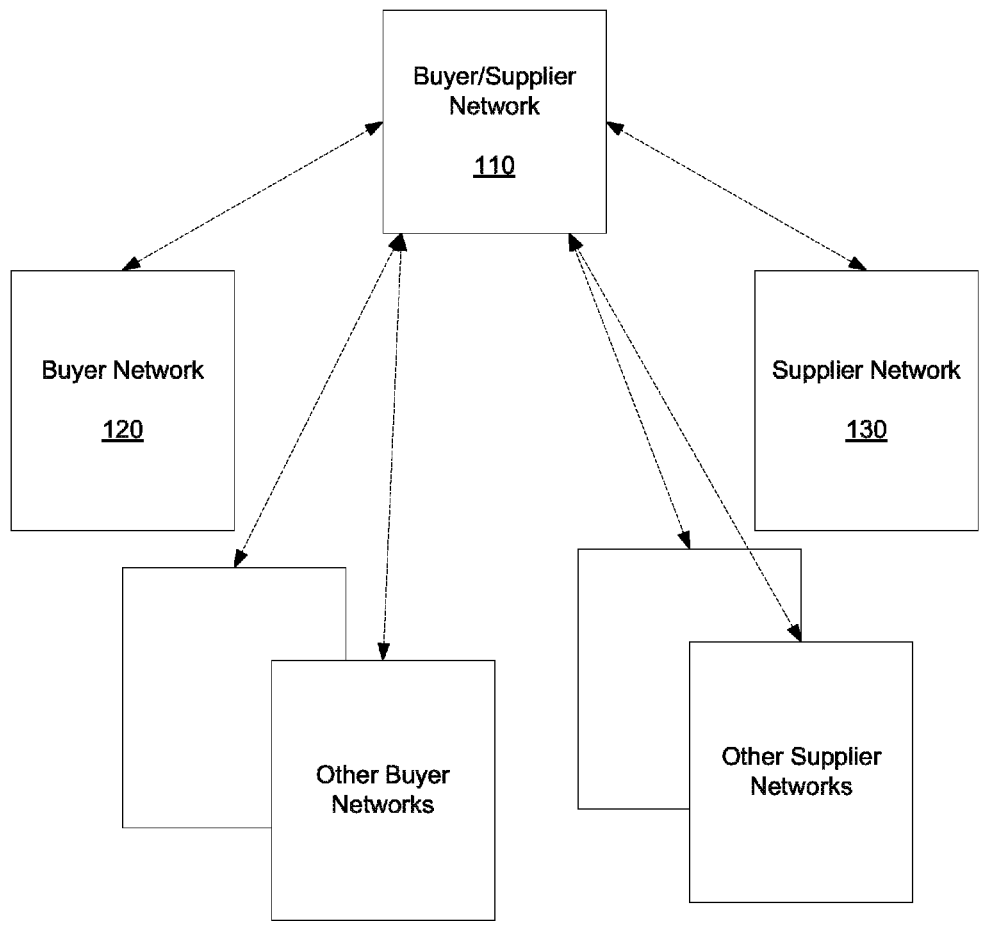
FIG. 1 shows an example of a system that facilitates a supplier/buyer (S/B) network providing catalog updates of a supplier to a buyer.

FIG. 1 shows an example of a system that facilitates a supplier/buyer (S/B) network 110 providing catalog updates of a supplier to a buyer. The supplier/buyer (S/B) network 110 provides an interface between a buyer network 120 and a supplier network 130. It is to be understood that the supplier/buyer (S/B) network 110 of FIG. 1 can facilitate interfacing between any number of buyers (buyer networks) and any number of suppliers (supplier networks). The supplier/buyer (S/B) network 110, the buyer network 120 and the supplier network 130 can each be implemented with one or more servers or computers (such as, a supplier/buyer server, a buyer server and a supplier server). Each of the supplier/buyer (S/B) network 110, the buyer network 120 and the supplier network 130 can be interconnected through, for example, the internet or any other type of network.

Generally, each supplier network (such as supplier network 130) completes a registration with the S/B network 110. For an embodiment, one element of the registration includes the supplier network 130 indicating within a supplier profile whether the supplier network 130 supports product information updates. Other elements of registration can include, for example, a supplier punchout address.

Embodiments include the S/B network 110 receiving a request for an update of product information of a catalog. Each catalog is generally available to many buyer networks (such as buyer network 120). For an embodiment, this includes the S/B network 110 periodically checks whether the buyer network 120 is requesting a product information update. The product information updates can be requested in various ways. For example, for one embodiment each buyer network 120 can select a frequency in which a request for product information updates is made. That is, for example, a buyer network 120 can select to request a product information update once per unit of time, such as, once a day, once a week or once a month. Alternatively, or additionally, each buyer network 120 can manually request for a product information update.

For an embodiment, the S/B network checks the request for product information. If the request includes multiple requests, the request can be broken into multiple sub-requests. That is, for example, if the request for product information includes request for a large number of products, the request can be broken into multiple smaller requests. More specifically, if the number of product in which product information is being requested is greater than a threshold number, then the request is broken into multiple requests. This can be an advantageous feature/embodiment because breaking up the request can reduce demands on the network, thereby avoiding, for example bandwidth problems. In the case of a failure, only a small request fails rather than a large request. The request other than a failed request may very well go through (pass). Upon a failure, only the failed subset of the total request needs to be resent or requested again.

Embodiments include various types of catalogs. For example, one type of catalog is a public catalog that is generically supplied to potential buyers. Another type of catalog is a buyer specific catalog that can be tailored or customized to a specific buyer. In either case, the buyer makes a request for product information updates, allowing the buyer to receive current product information updates.

The S/B network 110 can receive the product information request from the buyer network 120 for a specific product or item of the catalog. Once the S/B network 110 receives the product information request from the buyer network 120, the S/B network 110 checks that the supplier network supports catalog updates, and if so, the S/B network 110 extends the request to the supplier network 130. For an embodiment, the request can be extended to multiple supplier networks 130. It should be noted that the capability for allowing a buyer to request product information for a specific item or catalog is both valuable and powerful. More specifically, the updated information can be provided for just the specific product or item rather than providing a catalog update for an entire catalog which can be cumbersome. Additionally, as previously stated, an updated catalog does not have to be validated and approved.

Any loaded catalogs or the items in the catalogs need to follow some rules that determined what kind of values can be included in their fields. Together, these fields form or define a catalog item. For an embodiment, these rules are defined by buyer. The validation engine/process makes sure the field values in a catalog item follow these rules. If they do not follow the rules, errors are generated.

Additionally, embodiments include there being some approvals required by some catalog approvers (catalog approvers can be, for example, catalog experts in a buyer organization, a finance person, or a procurement person) before making a catalog available or use, consumption, or search by an end user/buyer. A catalog updated by the means or methods of the described embodiments does not need these approvals all over again. In contrast, if the updates were required to be loaded via a newer version of the catalog, the approval process would be required all over again.

The supplier network 130 then responds to the request from the S/B network 110 with an update to the specific product or item of the catalog. The updates in product information received from the supplier can include, for example, an indication of no change in the product information, or an indication that updates in specific products are not supported. A set of cXML responses (updates in product information) will be described later.

For embodiments, once the updates in product information are received, the catalog(s) is modified based on the updated product information. For an embodiment, a catalog index is rebuilt. Embodiments of the catalog index allow a buyer to search for product information of the catalog. Embodiments include updated product information being available to the buyer after modifying the catalog.

For embodiments, the catalog index is a repository (in file system, not database) of catalog data from various suppliers and for various buyers. The catalog data is sorted and divided based on various measures so as to make the catalog data searchable easily and faster by an end user/buyer. These embodiments provide benefits, such as, redundancy. The catalog data can be backed up. If, for example, the primary source of catalog data is not available for some reason, the same catalog data can be served by the back up.

For an embodiment, the catalog index works on version basis. When newer and updated catalog data is received, the index is rebuilt and updated to a newer version.

Another benefit these embodiments that include the catalog index, is that they provides support for existing version of catalog data until the newer version is built. Therefore, even if the newer version fails to complete for some reason, all of the valid catalog data of the previous versions is still be maintained and available for regular search and consumption.

Figure 2:
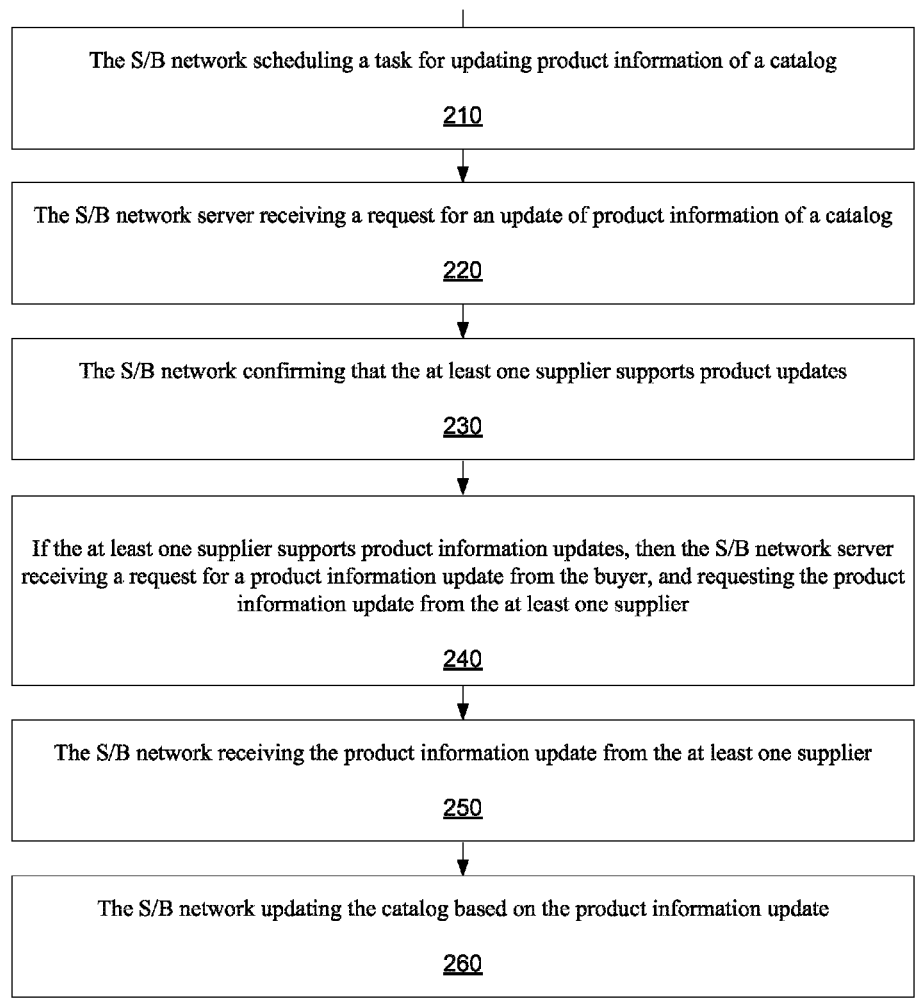
FIG. 2 is a flow chart that includes steps of an example of a method of a supplier/buyer (S/B) network providing catalog updates.

FIG. 2 is a flow chart that includes steps of an example of a method of a supplier/buyer (S/B) network providing catalog updates. A first step 210 includes the S/B network receiving a request for an update of product information of a catalog. It is to be understood that embodiment include performing a profile check of a supplier even before receiving a request for an update of the product information of step 210. That is, a profile check of the supplier can be performed to determine whether the supplier supports product information updates. For an embodiment, if the supplier does not support such product information updates, the request is not received, which minimized processing. It should also be understood, that embodiments allow the profile of the supplier to be updated at any time. A second step 220 includes the S/B network server receiving a profile request of at least one supplier from a buyer. A third step 230 includes the S/B network confirming that the at least one supplier supports product updates. If the at least one supplier supports product information updates, then a fourth step 240 includes the S/B network server receiving a request for a product information update from the buyer, and requesting the product information update from the at least one supplier. A fifth step 250 includes the S/B network receiving the product information update from the at least one supplier. A sixth step 260 includes the S/B network updating the catalog based on the product information update.

For embodiments, the product information update includes at least one of product price, product availability, and product lead time. Other product information updates can include any like-related items. Like-related items include, for example, whether the update-requested-item is not available, any alternate items, an indication of how many counts of the update-requested-item are in store, whether the update-requested-item environment friendly, or whether available in different colors/sizes or other parameters.

For an embodiment, the S/B network scheduling a task for updating product information of a catalog includes the S/B network periodically checking whether the buyer is requesting a product information update. The product information updates can be requested in various ways. For example, one embodiment includes each buyer can select a frequency in which a request for product information update is made. That is, for example, a buyer can select to request a product information update once per unit of time, such as, once a day, once a week or once a month. Alternatively, or additionally, each buyer can manually request for a product information update.

As previously described, an embodiment includes each supplier registering with the S/B network, wherein registration includes the supplier indicating within a supplier profile whether the supplier supports product information updates. The indication can suggest, for example, that the supplier supports a Data Universal Numbering System (DUNS) number which is a widely recognized identification number, that the supplier is a women or minority owned business, a Punchout address and/or various locations. It is to be understood that this is not an exhaustive list.

For an embodiment, the S/B network confirming that the at least one supplier supports product information updates includes the S/B network checking the corresponding supplier profile. The supplier profile can indicate, for example, what portions or subsets of the overall supplier profile can be provided to a buyer. For example, what updates are supported functionality is supported, such as, punch-out.

The product information requests can come in different forms. For an embodiment, the S/B network receiving a product information request from the buyer server includes the S/B network receiving the product information request for a specific product or item of the catalog. Once the S/B network receives the product information request from the buyer, the S/B network extends the request to the supplier. For an embodiment, the S/B network requesting the product information update from the at least one supplier includes the S/B network requesting the product information for the specific product or item of the catalog.

The S/B network can receive various product information updates from the suppliers. The updates in product information received from the supplier can include, for example, an indication of no change in the product information, or an indication that updates in specific products are not supported.

For embodiments, once the updates in product information are received, the catalog(s) is modified based on the updated product information. For an embodiment, a catalog index is rebuilt. Embodiments of the catalog index allow a buyer to search for product information of the catalog. Embodiments include updated product information being available to the buyer after modifying the catalog. As previously described, embodiment include providing the capability to rebuild the index with just the updated information, without needing to provide a whole new version of various catalogs with changes just to price/availability/lead time.

Embodiments include the product information updates being customizable by each of the suppliers based on the buyer requesting the product information updates. For example, if suppliers and buyers have some contractible terms or they do good business together, the suppliers can provide preferential and lower prices or some offers to certain buyers. Alternatively, or additionally, they can make an item available to one particular buyer. That is, they can hold the item for a buyer.

Figure 3:
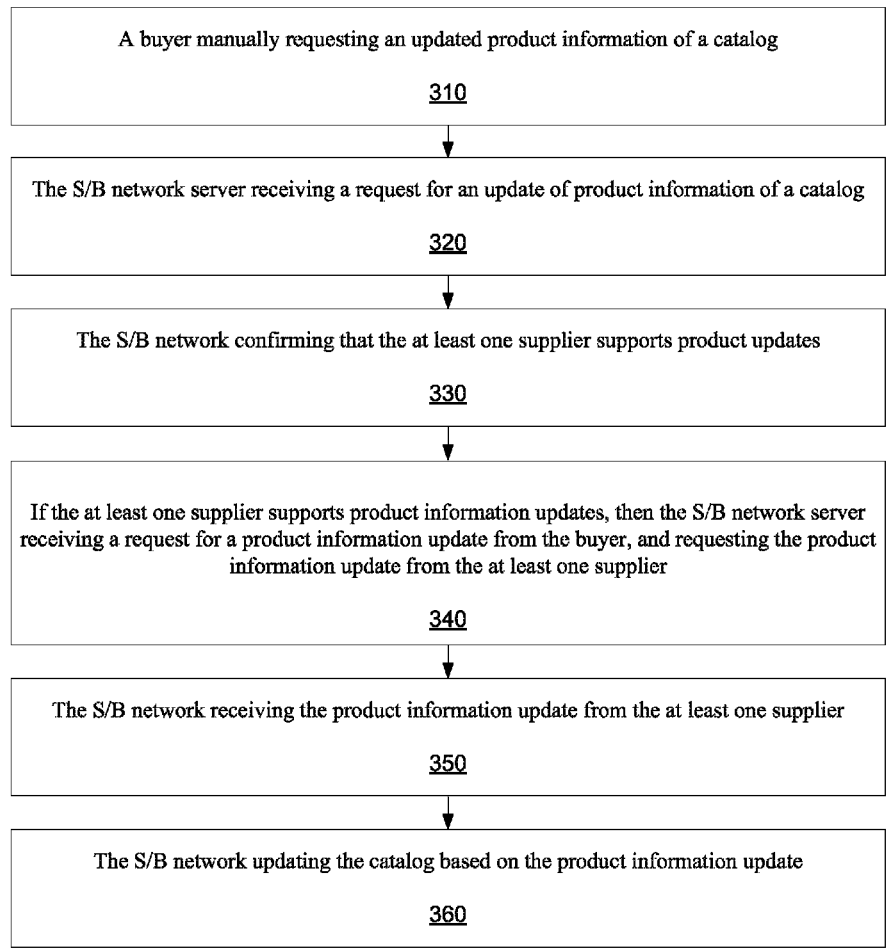
FIG. 3 is a flow chart that includes steps of another example of a method of a supplier/buyer (S/B) network providing catalog updates.

FIG. 3 is a flow chart that includes steps of another example of a method of a supplier/buyer (S/B) network providing catalog updates. This embodiment is very similar to the embodiment of FIG. 2, but alternatively includes a first step 310 that includes a buyer manually requesting updated product information of a catalog. It is to be understood that embodiments include performing a profile check of a supplier even before receiving a request for an update of the product information of step 310. That is, a profile check of the supplier can be performed to determine whether the supplier supports product information updates. For an embodiment, if the supplier does not support such product information updates, the request is not received, which minimized processing. It should also be understood, that embodiments allow the profile of the supplier to be updated at any time. A second step 320 includes the S/B network server receiving a profile request of at least one supplier from a buyer. A third step 330 includes the S/B network confirming that the at least one supplier supports product updates. If the at least one supplier supports product information updates, then a fourth step 340 includes the S/B network server receiving a request for a product information update from the buyer, and requesting the product information update from the at least one supplier. A fifth step 350 includes the S/B network receiving the product information update from the at least one supplier. A sixth step 360 includes the S/B network updating the catalog based on the product information update.

Descriptions of Specific Embodiments

For an embodiment, a supplier can send a Level 2 PunchOut catalog (described below) to all potential buyers with or without list pricing. For an embodiment, a Level 2 PunchOut allows a supplier to supply catalog items in a more useful way to customers by saving them from having to conduct searches both on their own procurement applications and the supplier site. The buyers can see all the items the supplier wishes to sell within, for example, a S/B network (such as, Ariba Buyer® or Ariba Procure-to-Pay®), and then punch out to the supplier site to complete the purchase. The supplier benefits by being able to selectively market and push content closer to customers, since they can see full descriptions, pictures, and other product details without having to go to the supplier site. Customers benefit by being able to find the products they need faster without having to navigate through multiple search mechanisms.

Level 2 PunchOut is a mechanism or process that lets the supplier supply catalog items in a more useful way to buyers by saving the buyer from having to conduct searches on both the buyer's procurement applications and the supplier site. The buyers can see all the items the supplier wishes to sell within S/B supplier network, and then punch out to the supplier site to complete the purchase. The supplier benefits by being able to selectively market and push content closer to buyers, since the buyer can see full descriptions, pictures, and other product details without having to go to the supplier site. Buyers benefit by being able to find the products they need faster without having to navigate through multiple search mechanisms.

A first exemplary use situation includes a supplier sending a single Level 2 PunchOut catalog to all of their buyers with list pricing or no pricing. For the product level punchout items, buyer specific pricing should be displayed and periodically check the pricing, availability and lead time of product level punchout items.

A solution to the first exemplary use situation includes the supplier configuring on a supply network whether the supplier supports responding to such update requests (as previously describe, this can be indicated in the supplier profile). For an embodiment, that means the supplier (supplier network) needs to understand an cXML request for pricing and availability updates for a several of the items and send back a cXML response for the same. For an embodiment, an application programming interface is provided that can be implemented by the supplier. The buyer network can submit a request to the supplier network with a list of items (part numbers) that the buyer would like to purchase. The supplier responds with the latest availability and optionally the latest price and lead time.

For an embodiment, the buyer network (that includes, for example, an Ariba Buyer® catalog manager) can configure the subscription to periodically (using a scheduled task) send a cXML message (for example, PriceAvailabilityRequest) to an S/B network requesting the updates for a set of items. This can be specified at the catalog level rather than at the item level for simplicity. S/B network receives the request, does a profile check on supplier and if the supplier supports these updates, then forwards the request from buyer to the supplier. Generally, the number of product level punchout items requested is expected to be manageable but in the case where the supplier provides a larger catalog the request can be broken up into multiple requests with each request having at most, for example, 1000 items. While it is expect that this is to be used primarily in conjunction with the S/B network (for example, and Ariba Supplier Network®) based catalog subscriptions it should be possible to configure this as long as the supplier has been synced with S/B network and the profile indicates that the supplier supports the product information updates. As described, embodiments also include the buyer being able to manually inquire if the supplier supports the product information requests, which is useful for providing real-time price and availability data.

As described, the supplier sends back a response with the updated data (requested product information) for the requested items. For an embodiment this includes an cXML response (such as, PriceAvailabilityResponse). The S/B network forwards this response as is to the buyer. The buyer network receives it and re-indexes the catalogs with the updated set of information. For a specific embodiment, this includes a CatalogModification cluster root being created for each item that has price/availability information provided by the supplier. A Catalog Modification is a place to store the details about the updated information. This contains the information about the catalog, the item in the catalog for which the update was received, the updated price if any, the updated availability info if any and the update lead time if any. This facilitates the mechanism to rebuild the index with updated information. This doesn't require or removes the need to have a new version of the catalog as the means of providing updated information.

If an existing CatalogModification already exists for that item it will be modified. The CatalogModification includes a link to the subscription it was created for. If a CatalogModification is no longer in use it is deleted or deactivated. The catalog item internal type will be modified so the price, lead time and availability attributes specify that their values are to come from the CatalogModification cluster root. If an updated price/availability has been provided then that will override the value specified in the catalog. If any new CatalogModifications then automatically re-index either the entire subscription or just those items whose CatalogModification changed. The updated information is available in the search index and as such will be seen in the search UI however the original catalog will not be updated. If the supplier specifies that an item is no longer available, that item is not removed from the catalog but instead just give an indication on the item that it's not available any more until the supplier provides a new catalog. When the supplier specifies that an item is no longer available, provision for the supplier to specify whether a replacement part exists or not has been provided.

It can be desirable for a punchout supplier to provide a distinct custom catalog to each buyer it has a relationship with. The customization can take two forms. Different buyers may be purchasing a different subset of the items which that supplier has for sale. Additionally, different buyers may be getting different prices. If can be easier for a supplier to only have to provide one L2 punchout catalog for all their buyers.

Additional embodiments for catalog content customization can include, filtering out those items in the catalog which the buyers don't actually want to purchase. Additionally or alternatively, it can be desirable to either hide all prices for that punchout catalog or use a separate mechanism to load our custom prices.

The described embodiments provide a couple of advantages for suppliers. The buyer provides the list of items it wants pricing (requested product information) for so the supplier's application may not need to be concerned with which items that buyer purchases when responding to the product information request. Also the described embodiments include a pull of data which simplifies things for a supplier that was currently generating catalog files and manually uploading them onto S/B network.

A situation can arise in which an item (for example, a product) has been added to a shopping cart either from a punchout request or a local catalog item. In the case of the punchout request, the information is accurate as of the time the punchout request was made. In the case of the local catalog item, the information is accurate as of the time the catalog was provided by the supplier. At various points in the requisition workflow it can be desirable to use the embodiments for requesting product information updates on the contents of the shopping cart to update the content. The catalog manager (for example, the S/B network) can configure how out of date an item for a given catalog should be before its contents are refreshed. This involves requesting information about the handful of items in the shopping cart rather than a significant subset of the catalog. It's possible that additional attributes besides price and lead-time are updated on the requisition based upon the supplier's response.

The described embodiment can further be adapted to allow a buyer to punch into a catalog for content. A product information request (for example, PriceAvailability) API can be used to check if the items are still available or if the pricing has changed at the moment content is returned to the procurement application.

A list of cXML messages have been introduced in an implementation of the described embodiments. Such xXML messages include, for example:

```
<!--
Definition of Price Availability Request. This is the data sent to external catalog source (e.g. supplier) containing the items for price and availability updates.
-->
<!ELEMENT PriceAvailabilityRequest (PriceAvailabilityRequestItem+)>
<!--
```

Definition of Price Availability Response. This is the data sent back in response to Price Availability Request.

```
-->
<!ELEMENT PriceAvailabilityResponse
    (PriceAvailabilityResponseItem+)>
<!--
```

The representation of a line item as it needs to be for price availability request.

```
-->
<! ELEMENT PriceAvailabilityRequestItem (ItemOut, Extrinsic*)>
<!--
```

The representation of a line item as it needs to be for price availability response.

```
-->
<!ELEMENT PriceAvailabilityResponseItem (ItemIn, Extrinsic*)>
<!ATTLIST PriceAvailabilityResponseItem
    type (available | unavailable | temporarilyUnavailable | unknown |
unrecognized | excluded ) #IMPLIED
>
```

As previously described, the supplier network 130 responds to requests from the S/B network 110, with product updates to the specific products or items of the catalog. The updates in product information received from the supplier can include, for example, an indication of no change in the product information, or an indication that updates in specific products are not supported. A set of more specific cXML responses including, for example a responses of Available, which implies that the requested item is available with the supplier and the supplier can optionally attach the latest price and lead time in the response to Buyer as part of the ItemIn element. Another response includes Unavailable, which implies that the requested item is unavailable with the supplier. Another response includes TemporarilyUnavailable, that implies that the requested item is temporarily unavailable with the supplier and the supplier can optionally attach the lead time & latest price in the response to buyer as part of the ItemIn element.

The ItemIn element is the representation of a line item as it needs to be for sending to a buyer. For example,

```
<!ELEMENT ItemIn (ItemID, ItemDetail, SupplierID?, ShipTo?,
    Shipping?, Tax?)>
<!ATTLIST ItemIn
    quantity % int; #REQUIRED
```

The ItemIn contains ItemDetail that essentially has detailed information about an item. All the data that a user wants to see about an item instead of the bare essentials that are represented in the ItemID. For example, Unit price or LeadTime which is the time in days to receive the item. For example,

```
<!ELEMENT ItemDetail (UnitPrice, Description+, UnitOfMeasure,
    Classification+, ManufacturerPartID?,
    ManufacturerName?, URL?, LeadTime?, Extrinsic*)>
```

No timeframe is provided about when it will become available. Another response includes Unknown, that implies that the availability status of the requested item is unknown. Another response includes Unrecognized, that implies that the requested item is an invalid item and not recognized by the supplier. Another response includes Excluded, that implies that the requested item is part of the generic catalog the supplier provides but is being filtered on the punchout site so it's not being shown to this buyer.

GLOSSARY

Ariba Buyer/Buyer: is an integral part of Ariba Spend Management Solutions, Ariba Buyer securely automates the full buying cycle to improve cross-enterprise management and tracking of spend operations. Ariba Buyer helps customers streamline the purchase of goods and services to reduce processing time and costs, improve management and leverage of spend, and maximize collaboration with a global network of trading partners. With Ariba Buyer, customers achieve rapid cost savings by increasing the efficiency of the entire procurement process. The Ariba buyer can be equated with the buyer network 120.

ASN: Ariba Supplier Network. Also referred to as Ariba Network (AN)-Ariba Supplier Network gives companies a comprehensive, shared business solution that automates and streamlines multiple business processes, from trading partner discovery to transaction management to financial settlement. The Ariba buyer can be equated with the supplier network 130.

Catalog: is a structured database with information about products items or services in a standardized format. Catalogs loaded in Ariba Buyer follow the CIF format or cXML standard.

Clusterroot: Embodiments include a layer of abstraction on top of the database called the Base Object layer. This allows manipulating, querying, and accessing objects in the database from Java code without needing to know details of the underlying database representation.

The basic functionality for persisting objects into the database is implemented in the BaseObject class. This class, together with the other classes in the Base Object layer, provides code that reads metadata XML type declarations, generates a database schema from those declarations, and handles database save and retrieve operations. For embodiments, every class that is saved to the database must inherit (either directly or indirectly) from the class BaseObject. Other objects do not persist after the server is shut down.

A cluster root (ClusterRoot) is a subclass of BaseObject. A cluster is a collection of related base objects, which moves between the database and the server as a unit. Clusters help improve database performance and efficiency, by providing hints about how data should be grouped. For example, when an object is cached, the entire cluster is cached. When an application accesses an object in memory, the entire cluster is pulled into memory. When allocating database tables, Ariba Buyer typically allocates one database table per cluster, and not one for each base object.

A cluster root is typically a "top level" object of interest throughout the system, whereas base objects have meaning only in the context of a containing cluster root. For example, Address, PCard, Approvable, and Supplier are all ClusterRoots, because they are each objects that are meaningful without requiring any additional context. On the other hand, a specific money amount, such as $19.63, has meaning only within a specific context, such as a requisition, expense report, or line item.

cXML: cXML is a streamlined protocol intended for consistent communication of business documents between procurement applications, e-commerce hubs and suppliers. The protocol does not include the full breadth of interactions some parties may wish to communicate. However, through the use of Extrinsic elements and newly-defined domains for various identifiers, it is easily expanded by such applications. This expansion is the limit of point-to-point configurations necessary for communication. The current standard includes documents for setup (company details and transaction profiles), catalogue content, application integration (including the widely-used PunchOut feature), original, change and delete purchase orders and responses to all of these requests, order confirmation and ship notice documents (cXML analogues of EDI 855 and 856 transactions) and new invoice documents.

Figure 4:
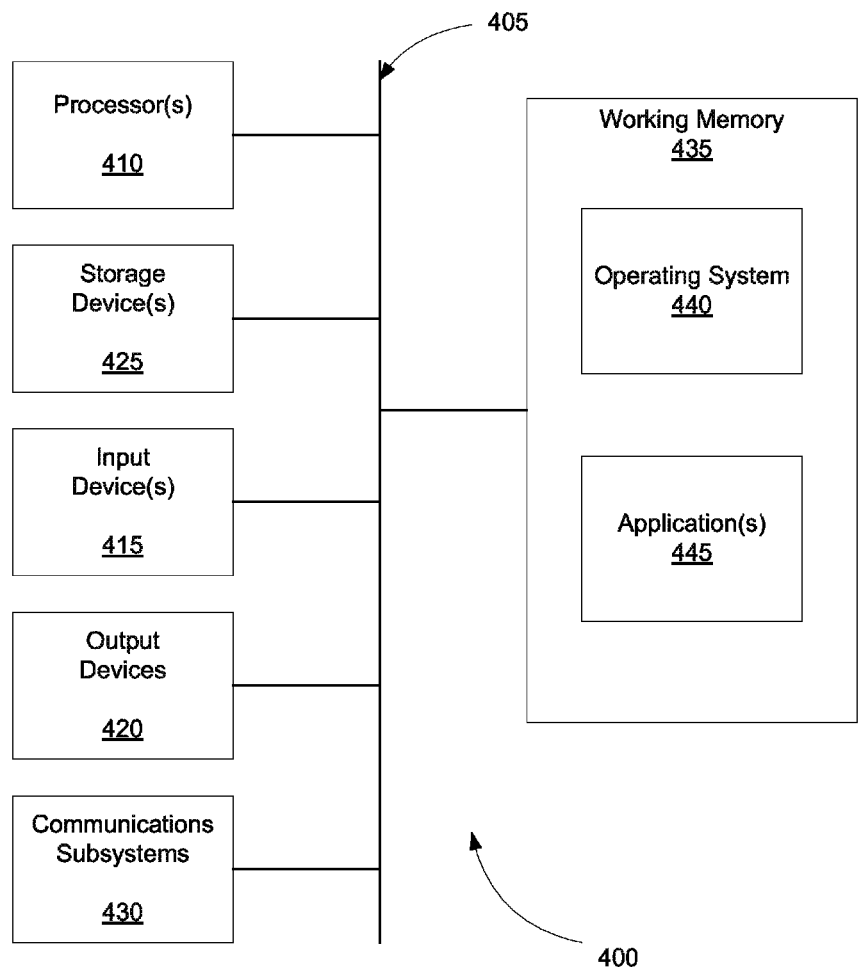
FIG. 4 shows a schematic illustration of one embodiment of a computer system that can perform the methods of the described embodiment, and/or can function as, for example, a supplier/buyer (S/B) network providing catalog updates.

FIG. 4 shows a schematic illustration of one embodiment of a computer system 400 that can perform the methods of the described embodiment, and/or can function as, for example, a supplier/buyer (S/B) network 110 that provides catalog updates. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, one or more input devices 415, which can include without limitation a mouse, a keyboard and/or the like; and one or more output devices 420, which can include without limitation a display device, a printer and/or the like. The computer system 400 may further include (and/or be in communication with) one or more storage devices 425. The computer system 400 also can comprise software elements, shown as being located within the working memory 435, including an operating system 440 and/or other code, such as one or more application programs 445, which may comprise computer programs of the described embodiments, and/or may be designed to implement methods of the described embodiments and/or configure systems of the embodiments as described herein.

Another embodiment includes a program storage device readable by a machine (of the B/S network), tangibly embodying a program of instructions executable by the machine to perform a method of providing catalog updates. The method performed includes a supplier/buyer (S/B) network the S/B network receiving a request for an update of product information of a catalog. The S/B network server receives a profile request of at least one supplier from a buyer. The S/B network confirming that the at least one supplier supports product updates. If the at least one supplier supports product information updates, then the S/B network receives a request for a product information update from the buyer, and requests the product information update from the at least one supplier. The S/B network receiving the product information update from the at least one supplier, and the S/B network updates the catalog based on the product information update.

Although specific embodiments have been described and illustrated, the embodiments are not to be limited to the specific forms or arrangements of parts so described and illustrated.

What is claimed:

1. A computer-method of a supplier/buyer (S/B) network providing catalog updates, comprising;
   receiving, by the S/B network, a request for an update of product information of a catalog, comprising the S/B network scheduling a task for updating product information of the catalog comprising the S/B network periodically checking whether a buyer is requesting a product information update;
   receiving, by the S/B network, a profile request of a supplier from the buyer;
   confirming, by the S/B network, that the supplier supports product updates, comprising checking a corresponding supplier profile of the supplier after receiving the profile request of the supplier;
   the S/B network receiving the request for a product information update from the buyer, and requesting the product information update from the supplier, after confirming that the supplier supports product updates, and after receiving the request for the product information update from the buyer;
   receiving, by the S/B network, the product information update from the supplier; and
   updating, by the S/B network the catalog based on the product information update.

2. The method of claim 1, wherein the product information update comprises at least one of product price, product availability, and product lead time.

3. The method of claim 1, further comprising receiving from each buyer a selected frequency in which a request for product information update is made, and performing the periodically checking of whether the buyer is requesting a product information update at the selected frequency.

4. The method of claim 1, further comprising each supplier registering with the S/B network, wherein registration includes the supplier indicating within a supplier profile whether the supplier supports product information updates.

5. The method of claim 1, wherein the S/B network receiving the product information request from the buyer server comprises the S/B network receiving the product information request for a specific product or item of the catalog.

6. The method of claim 1, wherein the S/B network receiving the product information request from the buyer server comprises the S/B network receiving requests for product information for multiple products or items.

7. The method of claim 6, further comprising determining whether the product information is requested for a number of products or items greater than a threshold, and after determination, breaking the request into multiple product information requests.

8. The method of claim 5, wherein the S/B network requesting the product information update from supplier comprises the S/B network requesting the product information for the specific product or item of the catalog.

9. The method of claim 1, wherein the S/B network receiving the product information update from the supplier comprises the supplier providing at least one of updates in product information, an indication of no change in the product information, an indication that updates in specific products are not supported.

10. The method of claim 1, further comprising modifying the catalog based on the updated product information and rebuilding a catalog index.

11. The method of claim 10, wherein the catalog index provides a means for allowing a buyer to search for product information of the catalog.

12. The method of claim 10, where updated product information is available to the buyer after modifying the catalog.

13. The method of claim 1, wherein product information updates are customizable by each of a plurality of suppliers based on the buyer requesting the product information updates.

14. The method of claim 13, further comprising determine whether the supplier has contracting terms with the buyer, and after determining, providing the buyer with product information updates that include lower prices than at least one other buyers that does not have contracting terms.

15. A supplier/buyer (S/B) network server that provides catalog updates, wherein the S/B network server is operative to:
  schedule a task for updating product information of a catalog comprising periodically checking whether a buyer is requesting a product information update;
  receive a profile request of at least one supplier of the S/B network server from a buyer server of the buyer;
  confirm that the at least one supplier supports product information updates, comprising checking a corresponding supplier profile of the supplier after receiving the profile request of the supplier;
  receive a request for a product information update from the buyer server, and requesting the product information update from at least one supplier server, after confirming that the at least one supplier supports product updates, and after receiving the request for the product information update from the buyer;
  receive the product information update from the at least one supplier server;
  update the catalog based on the product information update.

16. A computer-method of a supplier/buyer (S/B) network providing catalog updates, comprising;
  receiving, by the S/B network, a request for an update of product information of a catalog, comprising the S/B network scheduling a task for updating product information of the catalog comprising the S/B network periodically checking whether a buyer is requesting a product information update;
  receiving, by the S/B network, a profile request of at least one supplier from the buyer;
  confirming, by the S/B network, that the at least one supplier supports product updates, comprising checking a corresponding supplier profile after receiving the profile request of the supplier;
  S/B network receiving the request for a product information update from the buyer, and requesting the product information update from the at least one supplier, after confirming that the at least one supplier supports product updates, and after receiving the request for the product information update from the buyer;
  receiving, by the S/B network, the product information update from the at least one supplier comprising the S/B network receiving requests for product information for multiple products or items, breaking the request into multiple product information requests when the product information is requested for a number of products or items is greater than a threshold; and
  updating, by the S/B network the catalog based on the product information update.

* * * * *